(12) United States Patent
Dongare

(10) Patent No.: US 8,521,312 B2
(45) Date of Patent: Aug. 27, 2013

(54) APPARATUS AND METHOD FOR WIRELESS ACCESS AND CONTROL OF PROCESS CONTROL INSTRUMENTS

(75) Inventor: Mukund D. Dongare, Maharashtra (IN)

(73) Assignee: Honeywell International Inc., Morristown, NJ (US)

( * ) Notice: Subject to any disclaimer, the term of this patent is extended or adjusted under 35 U.S.C. 154(b) by 403 days.

(21) Appl. No.: 12/435,990

(22) Filed: May 5, 2009

(65) Prior Publication Data

US 2010/0036511 A1 Feb. 11, 2010

Related U.S. Application Data

(60) Provisional application No. 61/086,625, filed on Aug. 6, 2008.

(51) Int. Cl.
*G05B 15/00* (2006.01)

(52) U.S. Cl.
USPC .............................. 700/83; 356/419; 709/220

(58) Field of Classification Search
USPC ............................ 700/83; 356/419; 709/220
See application file for complete search history.

(56) References Cited

U.S. PATENT DOCUMENTS

| | | | | |
|---|---|---|---|---|
| 5,027,288 A * | 6/1991 | Suzuki et al. | ................. | 358/1.18 |
| 5,361,336 A * | 11/1994 | Atchison | ....................... | 715/740 |
| 6,463,290 B1 * | 10/2002 | Stilp et al. | .................. | 455/456.1 |
| 6,782,264 B2 * | 8/2004 | Anderson | ................... | 455/456.1 |
| 7,090,683 B2 * | 8/2006 | Brock et al. | ................... | 606/130 |
| 7,167,713 B2 * | 1/2007 | Anderson | .................. | 455/456.1 |
| 7,209,727 B2 * | 4/2007 | Castaneda et al. | ............. | 455/341 |
| 7,214,230 B2 * | 5/2007 | Brock et al. | ................... | 606/139 |
| 7,371,210 B2 * | 5/2008 | Brock et al. | ................... | 600/114 |
| 7,546,125 B2 * | 6/2009 | Sharma et al. | ................. | 455/436 |
| 7,567,785 B2 * | 7/2009 | Tsai et al. | .................... | 455/186.1 |
| 7,570,922 B2 * | 8/2009 | Williams | .................... | 455/67.11 |
| 7,634,322 B2 | 12/2009 | Samudrala et al. | | |
| 7,654,957 B2 * | 2/2010 | Abreu | ............................ | 600/399 |
| 7,656,271 B2 * | 2/2010 | Ehrman et al. | .................. | 340/5.8 |
| 7,688,820 B2 * | 3/2010 | Forte et al. | ..................... | 370/389 |
| 7,701,913 B2 * | 4/2010 | Chen et al. | ..................... | 370/338 |
| 7,760,905 B2 * | 7/2010 | Rhoads et al. | ................. | 382/100 |
| 7,819,859 B2 * | 10/2010 | Prisco et al. | ....................... | 606/1 |
| 7,978,062 B2 * | 7/2011 | Lalonde et al. | ........... | 340/539.11 |

(Continued)

OTHER PUBLICATIONS

Derek Benz, et al., "Knowledge Center: Process Performance", Control Engineering Asia, Apr. 2009, 12 pages, see esp. p. 10.

(Continued)

*Primary Examiner* — Mohammad Ali
*Assistant Examiner* — Anthony Whittington

(57) ABSTRACT

A method includes moving a wireless device into communication range of a process control instrument in an industrial process system. The method also includes presenting to a user, at the wireless device, a graphical user interface associated with the process control instrument. The method further includes receiving from the user one or more configuration settings associated with the process control instrument. In addition, the method includes transmitting information identifying the one or more configuration settings to the process control instrument in order to reconfigure the process control instrument. The method could optionally include presenting to the user, at the wireless device, a second graphical user interface when the wireless device is used to perform a function unrelated to interacting with the process control instrument. Here, the graphical user interface associated with the process control instrument could be presented in response to the wireless device detecting the process control instrument.

20 Claims, 4 Drawing Sheets

(56) References Cited

U.S. PATENT DOCUMENTS

| | | | |
|---|---|---|---|
| 2001/0038451 A1* | 11/2001 | Jung et al. | 356/328 |
| 2001/0038453 A1* | 11/2001 | Jung et al. | 356/419 |
| 2004/0010703 A1* | 1/2004 | Kouznetsov et al. | 713/200 |
| 2004/0025042 A1* | 2/2004 | Kouznetsov et al. | 713/200 |
| 2004/0133689 A1* | 7/2004 | Vasisht | 709/228 |
| 2006/0238159 A1* | 10/2006 | Jung | 318/587 |
| 2006/0276143 A1* | 12/2006 | Anglin | 455/81 |
| 2007/0103324 A1* | 5/2007 | Kosuge et al. | 340/618 |
| 2007/0126576 A1* | 6/2007 | Script et al. | 340/545.5 |
| 2008/0065243 A1* | 3/2008 | Fallman et al. | 700/83 |
| 2008/0094631 A1* | 4/2008 | Jung et al. | 356/419 |
| 2008/0109808 A1* | 5/2008 | Wing et al. | 718/102 |
| 2008/0155064 A1* | 6/2008 | Kosuge et al. | 709/219 |
| 2008/0222734 A1* | 9/2008 | Redlich et al. | 726/26 |
| 2009/0073423 A1* | 3/2009 | Jung et al. | 356/73 |

OTHER PUBLICATIONS

"UDC3500, Universal Digital Controller", Honeywell, Mar. 2007, p. 1-16.

"Infrared Thermostat Interface Module simplifies T7350 thermostat programming", Mar. 23, 2006, 2 pages.

* cited by examiner

APPARATUS AND METHOD FOR WIRELESS ACCESS AND CONTROL OF PROCESS CONTROL INSTRUMENTS

CROSS-REFERENCE TO RELATED APPLICATIONS

This application claims priority under 35 U.S.C. §119(e) to U.S. Provisional Patent Application No. 61/086,625 filed on Aug. 6, 2008, which is hereby incorporated by reference.

TECHNICAL FIELD

This disclosure relates generally to control systems and more specifically to an apparatus and method for access and control of process control instruments.

BACKGROUND

Processing facilities are often managed using process control systems. Example processing facilities include manufacturing plants, chemical plants, polymer plants, crude oil refineries, ore processing plants, and paper or pulp manufacturing and processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected. Various devices in conventional process control systems (such as the controllers and associated industrial equipment) often include physical user interfaces (such as keyboards and displays) that allow these devices to be accessed and configured by operators.

SUMMARY

This disclosure provides an apparatus and method for access and control of process control instruments.

In a first embodiment, a method includes moving a wireless device into communication range of a process control instrument in an industrial process system. The method also includes presenting to a user, at the wireless device, a graphical user interface associated with the process control instrument. The method further includes receiving from the user one or more configuration settings associated with the process control instrument. In addition, the method includes transmitting information identifying the one or more configuration settings to the process control instrument in order to reconfigure the process control instrument.

In a second embodiment, an apparatus includes a display, a processing system, and a wireless transceiver. The processing system is configured to present, on the display, a graphical user interface associated with a process control instrument in an industrial process system. The processing system is also configured to receive from a user one or more configuration settings associated with the process control instrument. The wireless transceiver is configured to transmit information identifying the one or more configuration settings to the process control instrument in order to reconfigure the process control instrument.

In a third embodiment, a computer readable medium embodies a computer program. The computer program includes computer readable program code for detecting and authenticating a wireless device at a process control instrument in an industrial process system. The computer program also includes computer readable program code for receiving from the wireless device one or more configuration settings associated with the process control instrument. The computer program further includes computer readable program code for reconfiguring the process control instrument based on the one or more configuration settings.

In a fourth embodiment, a system includes a process control instrument configured to perform one or more operations in an industrial process system capable of processing one or more materials. The system also includes a wireless device configured to present to a user a graphical user interface associated with the process control instrument. The wireless device is also configured to receive from the user one or more configuration settings associated with the process control instrument. The wireless device is further configured to transmit information identifying the one or more configuration settings to the process control instrument. The process control instrument is also configured to be reconfigured based on the information identifying the one or more configuration settings.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
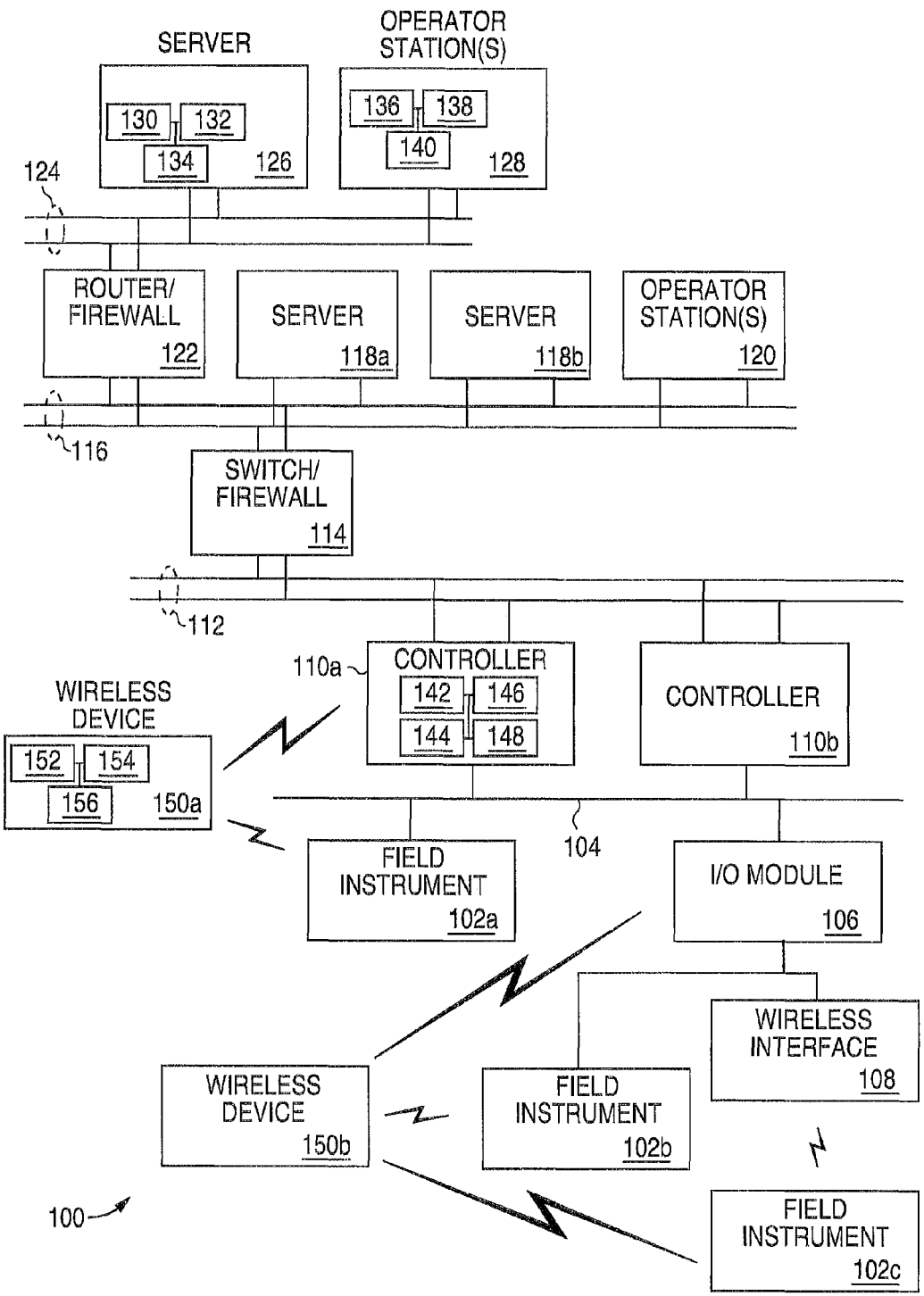
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material, such as various field instruments 102a-102c. For example, the field instruments 102a-102c could represent sensors that measure a wide variety of characteristics in a process system, such as temperature, pressure, or flow rate. The field instruments 102a-102c could also represent actuators that alter a wide variety of characteristics in the process system and may include components such as heaters, motors, or valves. The field instruments 102a-102c may represent any other or additional components. Each of the field instruments 102a-102c includes any suitable structure for performing one or more functions related to a process system. Also, a process system may generally represent any system or portion thereof configured to process one or more products or other materials in some manner.

The field instruments 102a-102c could be used in one or multiple configurations. For example, in FIG. 1, the field instrument 102a is coupled directly to at least one network 104. The network 104 facilitates communication with the field instruments, such as by transporting measurement data from sensors and providing control signals to actuators. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

The field instrument 102b is coupled indirectly to the network 104 through an input/output (I/O) module 106. The I/O module 106 represents an interface that couples one or multiple field instruments to a network. The I/O module 106 includes any suitable structure facilitating communication between field instruments and at least one network.

The field instrument 102c is a wireless field instrument that communicates with the I/O module 106 via a wireless interface 108. The wireless interface 108 could, for example, transmit information wirelessly to or receive information wirelessly from the field instrument 102c. The wireless interface 108 includes any suitable structure facilitating wireless communications with field instruments. The wireless interface 108 could, for example, represent an XYR 5000 transmitter from HONEYWELL INTERNATIONAL INC. While this represents three examples of how the field instruments 102a-102c can be used, any other or additional configurations could also be used.

Two controllers 110a-110b are coupled to the network 104. The controllers 110a-110b may, among other things, use data from some of the process instruments 102a-102c to control the operation of others of the process instruments 102a-102c. For example, the controllers 110a-110b could receive measurement data from sensors and use the measurement data to generate control signals for actuators. Each of the controllers 110a-110b includes any hardware, software, firmware, or combination thereof for interacting with and controlling field instruments. As a particular example, each of the controllers 110a-110b could represent a computing device running a MICROSOFT WINDOWS operating system.

Two networks 112 are coupled to the controllers 110a-110b. The networks 112 facilitate interaction with the controllers 11a-10b, such as by transporting data to and from the controllers 110a-110b. The networks 112 could represent any suitable networks or combination of networks. As particular examples, the networks 112 could represent a pair of Ethernet networks or a redundant pair of Ethernet networks, such as a FAULT TOLERANT ETHERNET (FTE) network from HONEYWELL INTERNATIONAL INC.

At least one switch/firewall 114 couples the networks 112 to two networks 116. The switch/firewall 114 may transport traffic from one network to another. The switch/firewall 114 may also block traffic on one network from reaching another network. The switch/firewall 110 includes any suitable structure for providing communication between networks, such as a CONTROL FIREWALL (CF9) device from HONEYWELL INTERNATIONAL INC. The networks 116 could represent any suitable networks, such as a pair of Ethernet networks or an FTE network.

Two servers 118a-118b are coupled to the networks 116. The servers 118a-118b perform various functions to support the operation and control of the controllers 110a-110b and field instruments 102a-102c. For example, the servers 118a-118b could log information collected or generated by the controllers 110a-110b, such as measurement data from sensors or control signals for actuators. The servers 118a-118b could also execute applications that control the operation of the controllers 110a-110b, thereby controlling the operation of the field instruments 102a-102c. In addition, the servers 118a-118b could provide secure access to the controllers 110a-110b. Each of the servers 118a-118b includes any hardware, software, firmware, or combination thereof for providing access to, control of, or operations related to the controllers 110a-110b. Each of the servers 118a-118b could, for example, represent a computing device running a MICROSOFT WINDOWS operating system.

One or more operator stations 120 are coupled to the networks 116. The operator stations 120 represent computing or communication devices providing user access to the servers 118a-118b, which could then provide user access to the controllers 110a-110b (and possibly the field instruments 102a-102c). As particular examples, the operator stations 120 could allow users to review the operational history of sensors and actuators using information collected by the controllers 110a-110b and/or the servers 118a-118b. The operator stations 120 could also allow the users to adjust the operation of the field instruments 102a-102c, controllers 110a-110b, servers 118a-118b, or other components. In addition, the operator stations 120 could receive and display warnings, alerts, or other messages or displays generated by the controllers 110a-110b or the servers 118a-118b. Each of the operator stations 120 includes any hardware, software, firmware, or combination thereof for supporting user access and control of the system 100. Each of the operator stations 120 could, for example, represent a computing device running a MICROSOFT WINDOWS operating system.

At least one router/firewall 122 couples the networks 116 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any hardware, software, firmware, or combination thereof for controlling the overall operation of the system 100.

One or more operator stations 128 are coupled to the networks 124. The operator stations 128 represent computing or communication devices providing, for example, user access to the servers 118a-118b, 126. Each of the operator stations 128 includes any hardware, software, firmware, or combination thereof for supporting user access and control of the system 100. Each of the operator stations 128 could, for example, represent a computing device running a MICROSOFT WINDOWS operating system.

In particular embodiments, the various servers, operator stations, controllers, I/O modules, and field instruments may represent computing devices. For example, each of the servers 118a-118b, 126 could include one or more processors 130 and one or more memories 132 storing instructions and data used, generated, or collected by the processor(s) 130. Each of the servers 118a-118b, 126 could also include at least one network interface 134, such as one or more Ethernet interfaces. Also, each of the operator stations 120, 128 could include one or more processors 136 and one or more memories 138 storing instructions and data used, generated, or collected by the processor(s) 136. Each of the operator stations 120, 128 could also include at least one network interface 140, such as one or more Ethernet interfaces. In addition, each of the controllers 110a-110b, I/O modules 106, and field instruments 102a-102c could include one or more processors 142 and one or more memories 144 storing instructions and data used, generated, or collected by the processor(s) 142. Each of the controllers 110a-110b, I/O modules 106, and field instruments 102a-102c could also include at least one network interface 146 (such as one or more Ethernet interfaces) and at least one wireless transceiver 148 (such as an IEEE 802.11 or BLUETOOTH transceiver).

In one aspect of operation, various devices in the system 100 can be accessed or configured using one or more wireless devices 150a-150b. The devices that can be accessed or configured could include the field instruments 102a-102c, the I/O module 106, and the controllers 110a-110b. Devices that can be accessed or configured by the wireless devices 150a-150b are collectively referred to as "process control instruments." Any process control instrument could be accessed or configured by the wireless devices 150a-150b, such as pressure or other sensors, programmable logic controllers (PLCs), temperature or other controllers, various types of transmitters or recorders, or digital or analog input/output devices. In particular embodiments, the process control instruments include various devices within "Level 1" or "Level 0" of a process control system (as defined by the Purdue model of process control).

When a wireless device 150a-150b nears a process control instrument, a graphical user interface (GUI) can be presented to a user on the wireless device. The wireless device can receive and present data associated with the process control instrument (such as maintenance data) to the user via the GUI. The wireless device could also display configuration options associated with the process control instrument to the user via the GUI and allow the user to provide configuration settings for the process control instrument. Any other suitable interactions and data transfers could occur between a wireless device and a process control instrument.

In this way, process control instruments need not include physical user interface components such as keyboards or displays. The process control instruments can therefore have smaller power supplies, lower costs, and smaller sizes. Also, the wireless devices 150a-150b could provide better visibility (such as in outdoor conditions) and better, more convenient, or easier access to the process control instruments and provide debugging capabilities not typically available in process control instruments. In addition, special enclosure standards are not required, special communication standards need not be used, and EMI/EMC compliance is more easily obtained (these are typically associated with the use of physical keyboards and displays in conventional process control instruments).

The use of BLUETOOTH or other wireless protocols may enable more standard communications between the various devices in the system 100. For example, BLUETOOTH technology is typically a standard feature in most wireless telephones, laptop computers, and personal digital assistants (PDAs). As a result, the use of BLUETOOTH may enable a large number of devices to access field instruments and other components in the system 100. Moreover, one or more suitable security mechanisms (such as username-password combinations, public-private cryptographic keys, or digital signatures) could be used to provide secure communications between the various devices in the system 100. As a result, the system 100 can support a secure and easy way to access and configure field instruments and other devices in the system 100.

Each of the wireless devices 150a-150b includes any suitable structure for interacting wirelessly with one or more process control instruments. Each of the wireless devices 150a-150b could, for example, include one or more processors 152 and one or more memories 154 storing instructions and data used, generated, or collected by the processor(s) 152. Each of the wireless devices 150a-150b could also include at least one wireless transceiver 156 (such as an IEEE 802.11 or BLUETOOTH transceiver). As particular examples, each of the wireless devices 150a-150b could represent any portable computing or communication device, such as a mobile telephone, laptop computer, or PDA. Additional details regarding the process control instruments and the wireless devices are provided in FIG. 2, which is described below.

Although FIG. 1 illustrates one example of a process control system 100, various changes may be made to FIG. 1. For example, a control system could include any number of field instruments, I/O modules, wireless interfaces, controllers, servers, operator stations, networks, and wireless devices. Also, the makeup and arrangement of the process control system 100 are for illustration only. Components could be added, omitted, combined, subdivided, or placed in any other suitable configuration according to particular needs. In addition, FIG. 1 illustrates one operational environment in which wireless access or configuration of process control instruments can be used. This functionality could be used in any other suitable device or system.

Figure 2:
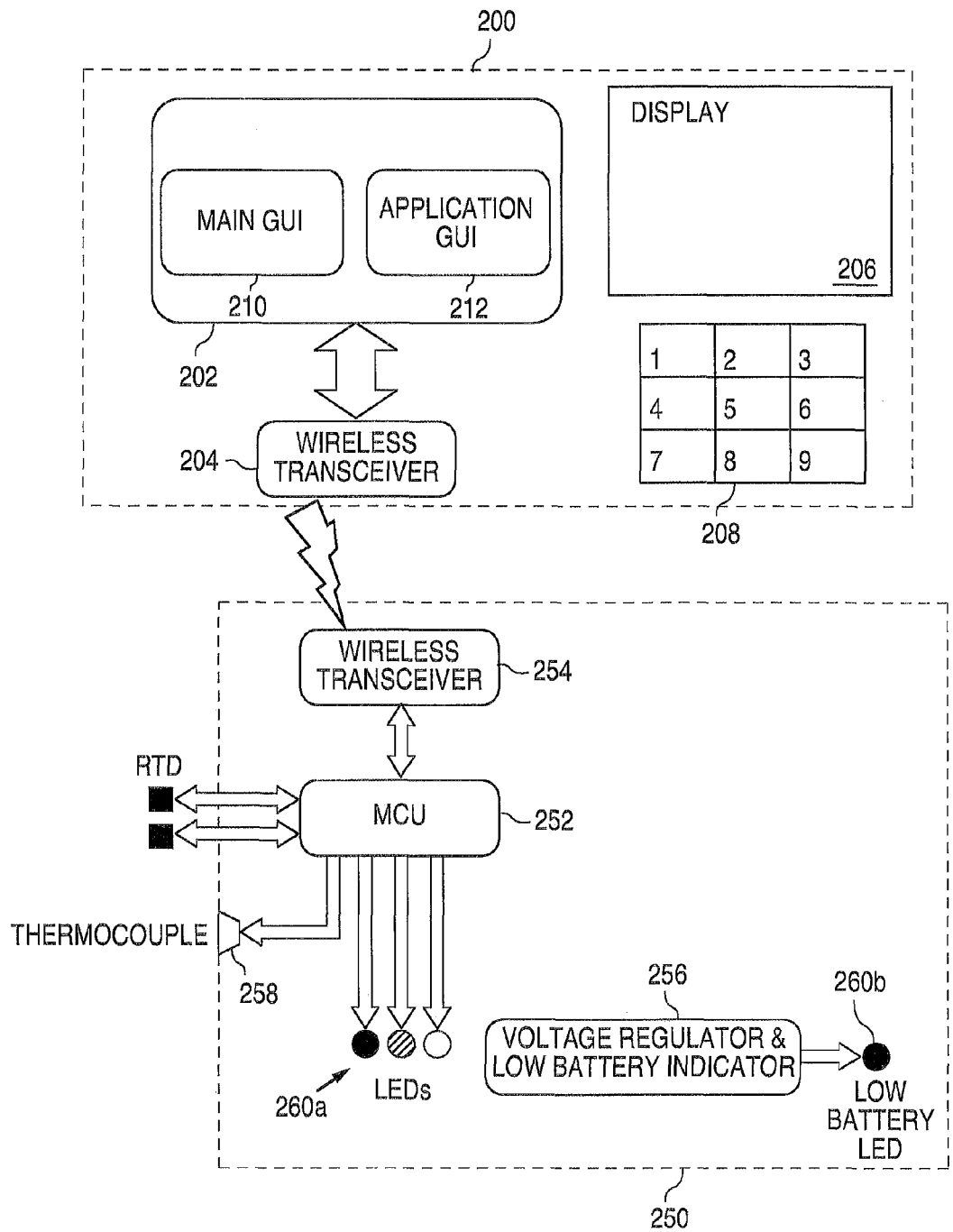
FIG. 2 illustrates an example wireless device and an example process control instrument according to this disclosure.

FIG. 2 illustrates an example wireless device 200 and an example process control instrument 250 according to this disclosure. The wireless device 200 could represent the wireless devices 150a-150b in FIG. 1, and the process control instrument 250 could represent the field instruments 102a-102c, I/O modules 106, or controllers 110a-110b in FIG. 1. The embodiments of the wireless device 200 and the process control instrument 250 shown in FIG. 2 are for illustration only. Other embodiments of the wireless device 200 and the process control instrument 250 could be used without departing from the scope of this disclosure.

As shown in FIG. 2, the wireless device 200 includes a processing system 202, a wireless transceiver 204, a display 206, and a keypad 208. The processing system 202 generally performs the various processing functions required in the wireless device 200, which can vary depending on the type of wireless device being used (and the other functions it performs). For example, the processing system 202 could support one set of functions in a wireless telephone and a different (although possibly overlapping or encompassing) set of features in a PDA or laptop computer. The processing system 202 includes any hardware, software, firmware, or combination thereof for performing one or more processing functions. The processing system 202 could, for example, include a processor, microprocessor, microcontroller, field programmable gate array, or other processing or control device.

The wireless transceiver 204 represents any suitable wireless interface for transmitting and receiving information wirelessly. For example, the wireless transceiver 204 could support any suitable radio frequency (RF) communications, such as communications using an IEEE 802.11 protocol or a BLUETOOTH protocol. However, any other suitable protocol and/or type of wireless signal (such as infrared signals)

could be supported by the wireless transceiver 204. Also, the transceiver 204 could include a transmitter and a separate receiver. In addition, if only one-way communication is desired, the transceiver 204 could be replaced with only a transmitter or only a receiver.

The display 206 represents any suitable structure for graphically presenting information to a user, such as via a graphical user interface. The display 206 could, for example, represent a liquid crystal display (LCD) or light emitting diode (LED) display. The keypad 208 represents any suitable structure for providing input to the wireless device 200 using keys or buttons. While shown as a numeric keypad here, the keypad 208 could provide character data in addition to numeric data. Alternatively, the keypad 208 could represent a keyboard, such as a full QWERTY keyboard. In addition, while the keypad 208 is shown separate from the display 206, some or all of the buttons in the keypad 208 could be implemented using the display 206, such as by using a touch-sensitive display and presenting "soft" buttons on the display 206.

In this example, the processing system 202 executes or otherwise supports both a main GUI 210 and an application GUI 212. The main GUI 210 represents a main or usual graphical user interface presented via the display 206 during normal operation of the wireless device 200. For example, in a mobile telephone, the main GUI 210 could support interfaces used for making or receiving telephone calls, accessing messages, and accessing mobile telephone settings. In a PDA, the main GUI 210 could support access to the normal functions of the PDA.

The application GUI 212 represents a secondary or supplemental graphical user interface related to accessing or configuring process control instruments. For example, the application GUI 212 may present maintenance or other data received from the process control instrument 250 to the user via the display 206. The application GUI 212 may also receive configuration settings or other data from the user (such as via the keypad 208) and provide the data to the process control instrument 250. Each of the GUIs 210-212 represents any suitable hardware, software, firmware, or combination thereof for generating a user interface.

As shown in FIG. 2, the process control instrument 250 includes a master or management control unit (MCU) 252, a wireless transceiver 254, a voltage regulator and low battery indicator 256, a buzzer 258, and various LEDs 260a-260b. The MCU 252 generally performs the various processing and other functions required in the process control instrument 250. In this example, the MCU 252 receives data from a sensor (a thermocouple) and exchanges real-time data (RTD) with another external component. The MCU 252 could also interact and exchange data with the wireless transceiver 254. The MCU 252 could further illuminate one or more of the LEDs 260a to visually identify a status of the process control instrument 250. The MCU 252 could perform any other or additional operations depending on the function(s) of the particular process control instrument 250 (such as functions performed by a field instrument, I/O module, or controller). The MCU 252 includes any hardware, software, firmware, or combination thereof for performing processing or other functions, such as a processor, microprocessor, microcontroller, field programmable gate array, or other processing or control device.

The wireless transceiver 254 represents any suitable wireless interface for transmitting or receiving information wirelessly, such as an IEEE 802.11 or BLUETOOTH transceiver. The voltage regulator and low battery indicator 256 receives operating power (such as from a battery or other power source) and provides operating voltages to the MCU 252 and the wireless transceiver 254. The voltage regulator and low battery indicator 256 can also detect a low voltage received from the power source and trigger the LED 260b. The voltage regulator and low battery indicator 256 includes any suitable structure for regulating at least one voltage and detecting a low-voltage condition.

The buzzer 258 and the LEDs 260a-260b represent user interface components that audibly or visually convey information. For example, the buzzer 258 could be triggered when a problem in the process control instrument 250 is detected or when the process control instrument 250 detects the presence of the wireless device 200. The buzzer 258 represents any suitable structure for generating audible signals. The LEDs 260a-260b can be illuminated to denote the status of the process control instrument 250, such as when one of the LEDs 260a is illuminated to denote one of three conditions or when the LED 260b is illuminated to denote a low-voltage condition. The LEDs 260a-260b represent any suitable structures for emitting light. The buzzer 258 and LEDs 260a-260b could be used to convey any other or additional information.

In one aspect of operation, the MCU 252 in the process control instrument 250 and the processing system 202 in the wireless device 200 can interact via their wireless transceivers 254 and 204. This allows, for example, the MCU 252 to provide maintenance or other data to the wireless device 200 for processing or display. This also allows the wireless device 200 to provide configuration data to the process control instrument 250, which can reconfigure the operation of the process control instrument 250. This can be done without requiring the use of a display and keyboard physically coupled to the process control instrument 250. Also, the use of RF signals may be preferred to the use of infrared signals, which have a more limited range and requires line-of-sight access to the process control instrument 250. Further, these RF communications may be faster and use industry-standard communication protocols, and many wireless devices (such as mobile phones, laptop computers, and PDAs) come with built-in RF wireless capabilities as well as built-in displays and keypads. In addition, the interfaces provided to a user (via the application GUI 212) could be customized based on the user's device, separate or custom hardware designs for configurators of multiple process control instruments are not required, and some wireless devices 200 have a very small footprint.

Although FIG. 2 illustrates one example of a wireless device 200 and one example of a process control instrument 250, various changes may be made to FIG. 2. For example, the wireless device 200 and the process control instrument 250 could each include any other or additional components according to particular needs. Also, while the process control instrument 250 is shown as being accessed directly by the wireless device 200, the wireless device 200 and the process control instrument 250 could communicate indirectly (such as through a base station or other wireless routing device).

Figure 3A:
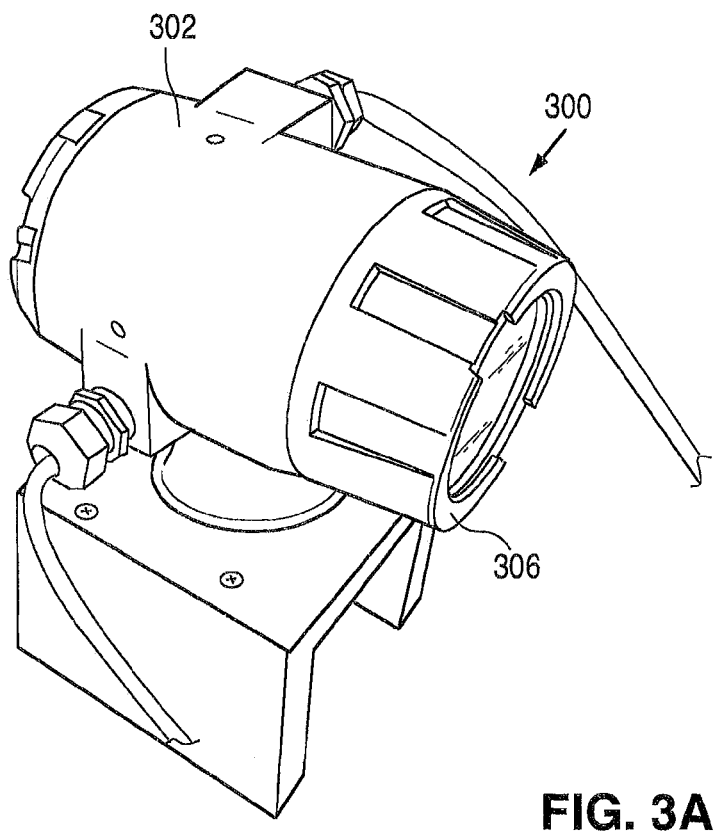
FIGS. 3A and 3B illustrate an example enclosure for a process control instrument according to this disclosure.
Figure 3B:
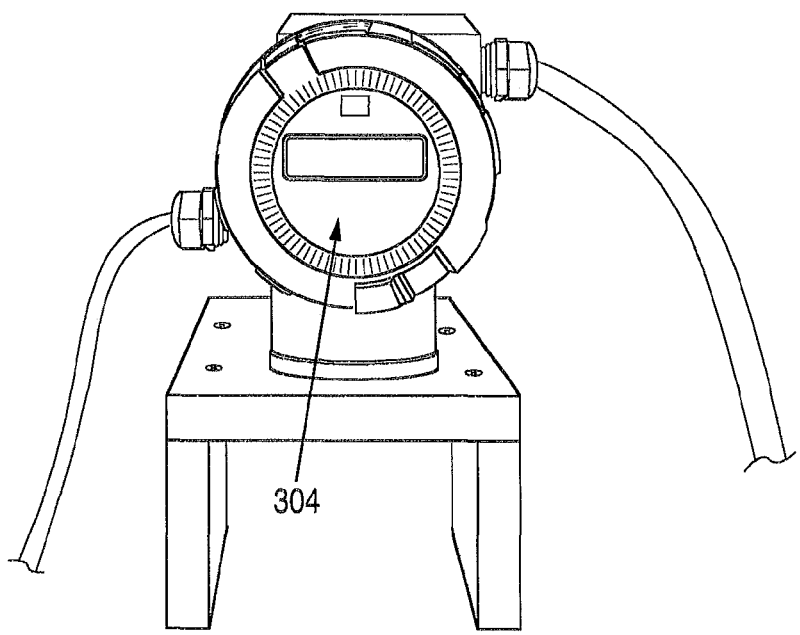

FIGS. 3A and 3B illustrate an example enclosure 300 for a process control instrument according to this disclosure. The enclosure 300 shown in FIGS. 3A and 3B is for illustration only. Process control instruments could have any other suitable enclosures without departing from the scope of this disclosure.

As shown in FIGS. 3A and 3B, the enclosure 300 includes a casing 302 and a clear plate 304 in front of the process control instrument. The casing 302 generally protects the internal components of the process control instrument. The casing 302 could be made of metal or other protective material(s), which may be necessary in industrial facilities and other harsh environments.

The clear plate 304 facilitates wireless transmissions to and from a wireless transceiver (such as transceiver 148 or 254) within the casing 302. For instance, a metal casing 302 could interfere with wireless transmissions to and from an internal wireless transceiver, while the clear plate 304 may allow for more effective communications with the internal wireless transceiver. The clear plate 304 could also allow personnel to view other components of the process control instrument, such as a display or LEDs of the process control instrument. The clear plate 304 could be formed from any suitable material(s), such as glass.

The process control instrument could further include a connector 306 attaching the clear plate 304 to the casing 302. The connector 306 could be formed from any suitable material(s), such as plastic or other rugged material.

Although FIGS. 3A and 3B illustrate one example of an enclosure 300 for a process control instrument, various changes may be made to FIGS. 3A and 3B. For example, each component of the enclosure could be formed from any suitable material(s). Also, each component could have any suitable size or shape, and the clear plate 304 could be placed at any suitable location of the enclosure (not necessarily the front).

Figure 4:
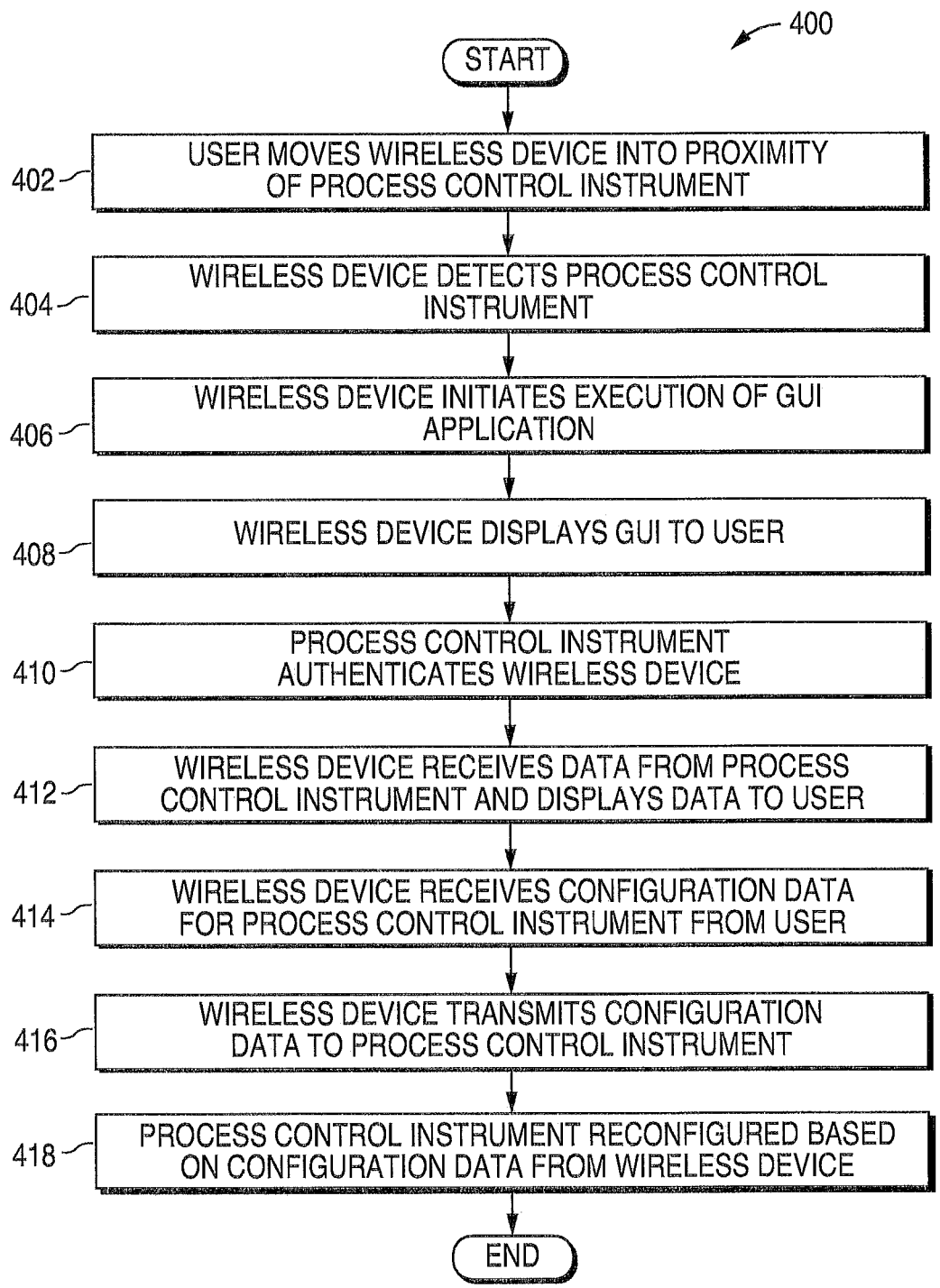
FIG. 4 illustrates an example method for access and control of process control instruments according to this disclosure.

FIG. 4 illustrates an example method 400 for access and control of process control instruments according to this disclosure. The embodiment of the method 400 shown in FIG. 4 is for illustration only. Other embodiments of the method 400 could be used without departing from the scope of this disclosure.

A user moves a wireless device into proximity of a process control instrument at step 402. This could include, for example, the user physically approaching the process control instrument 250 so that the transceiver 204 in the wireless device 200 is within RF range of the transceiver 254 in the process control instrument 250.

The wireless device detects the process control instrument at step 404. This could include, for example, the transceiver 204 in the wireless device 200 receiving signals from the transceiver 254 in the process control instrument 250. As a particular example, the transceiver 254 in the process control instrument 250 could broadcast beacons or other wireless signals at specified intervals or transmit a message in response to a query from the wireless device 200.

The wireless device initiates execution of a GUI application at step 406. This could include, for example, the processing system 202 in the wireless device 200 initiating execution of the application GUI 212. The wireless device presents a graphical user interface to the user at step 408. The application GUI 212 could, for example, present the graphical user interface to the user on the display 206 of the wireless device 200. The graphical user interface is used to provide information related to the process control instrument 250.

The process control instrument authenticates the wireless device at step 410. Any suitable technique could be used here to ensure that the wireless device 200 is authorized to access the process control instrument 250. For example, the process control instrument 250 could transmit a query to the wireless device 200 and verify whether an expected response is received. The process control instrument 250 could also support the use of username-password combinations, public-private cryptographic keys, or any other suitable security mechanism.

If authenticated, the wireless device and the process control instrument could engage in any suitable communications and exchange any suitable data. For example, the wireless device could receive maintenance or other data from the process control instrument and display the data to the user at step 412. The wireless device could also receive configuration data from the user at step 414 and provide the configuration data to the process control instrument at step 416, which reconfigures the process control instrument at step 418. In this way, the user can easily access and configure the process control instrument 250 with a wireless device 200, such as a wireless PDA, laptop, or mobile telephone.

Although FIG. 4 illustrates one example of a method 400 for access and control of process control instruments, various changes may be made to FIG. 4. For example, while shown as a series of steps, various steps in FIG. 4 could overlap, occur in parallel, occur multiple times, or occur in a different order. Also, in other embodiments, the wireless device 200 could access the process control instrument 250 without requiring the wireless device 200 to be moved into proximity to the process control instrument 250 (such as when the wireless device 200 and the process control instrument 250 communicate via a base station).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship with or to, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    detecting a process control instrument at a wireless device when the wireless device is moved into a communication range of the process control instrument in an industrial process system, wherein the wireless device is moved into the communication range of the process control instrument by being moved to a position where the wireless device receives radio frequency signals directly from the process control instrument;
    presenting to a user, at the wireless device, a first graphical user interface associated with the process control instrument in response to detecting the process control instrument at the wireless device;
    receiving from the user, via the first graphical user interface, one or more configuration settings associated with the process control instrument;
    transmitting information identifying the one or more configuration settings to the process control instrument in order to reconfigure the process control instrument; and
    presenting to the user, at the wireless device, a second graphical user interface when the wireless device is used to perform a function unrelated to interacting with the process control instrument;
    wherein presenting the first graphical user interface associated with the process control instrument occurs in response to the wireless device detecting the radio frequency signals received directly from the process control instrument.

2. The method of claim 1, wherein detecting the process control instrument at the wireless device comprises detecting the process control instrument based on at least one of: a beacon and a query response from the process control instrument.

3. The method of claim 1, further comprising:
    receiving, at the wireless device, data associated with the process control instrument from the process control instrument; and
    displaying the data to the user via the first graphical user interface.

4. The method of claim 3, wherein the data comprises maintenance data associated with the process control instrument.

5. The method of claim 1, wherein the wireless device comprises one of: a laptop computer, a mobile telephone, and a personal digital assistant.

6. An apparatus comprising:
    a display;
    a processing system configured to:
        present, on the display, a first graphical user interface associated with a process control instrument in an industrial process system in response to detecting the process control instrument at the apparatus; and
        receive from a user, via the first graphical user interface, one or more configuration settings associated with the process control instrument; and
    a wireless transceiver configured to transmit information identifying the one or more configuration settings to the process control instrument in order to reconfigure the process control instrument;
    wherein the wireless transceiver comprises a radio frequency transceiver configured to receive incoming radio frequency signals directly from the process control instrument and to transmit outgoing radio frequency signals directly to the process control instrument;
    wherein the processing system is further configured to present a second graphical user interface on the display when the apparatus is used to perform a function unrelated to interacting with the process control instrument; and
    wherein the processing system is configured to present the first graphical user interface associated with the process control instrument on the display in response to detecting the radio frequency signals received directly from the process control instrument.

7. The apparatus of claim 6, wherein the processing system is configured to detect the process control instrument based on at least one of: a beacon and a query response from the process control instrument.

8. The apparatus of claim 6, wherein:
    the wireless transceiver is further configured to receive data associated with the process control instrument from the process control instrument; and
    the processing system is further configured to present the data to the user on the display via the first graphical user interface.

9. The apparatus of claim 6, wherein the apparatus comprises one of: a laptop computer, a mobile telephone, and a personal digital assistant.

10. A system comprising:
    a process control instrument configured to perform one or more operations in an industrial process system that is configured to process one or more materials; and
    a wireless device configured to:
        detect the process control instrument when the wireless device is moved into a communication range of the process control instrument;
        present, to a user, a first graphical user interface associated with the process control instrument in response to detecting the process control instrument at the wireless device;
        receive from the user, via the first graphical user interface, one or more configuration settings associated with the process control instrument; and
        transmit information identifying the one or more configuration settings to the process control instrument;
    wherein the process control instrument is further configured to be reconfigured based on the information identifying the one or more configuration settings;
    wherein the wireless device comprises a radio frequency transceiver configured to receive incoming radio frequency signals directly from the process control instrument and to transmit outgoing radio frequency signals directly to the process control instrument;
    wherein the wireless device is further configured to present a second graphical user interface when the wireless device is used to perform a function unrelated to interacting with the process control instrument; and
    wherein the wireless device is configured to present the first graphical user interface associated with the process control instrument in response to detecting the radio frequency signals received directly from the process control instrument.

11. The system of claim 10, wherein:
    the system comprises multiple wireless devices of different types and multiple process control instruments;
    each wireless device is configured to interact with at least two of the process control instruments; and
    each wireless device is configured to present a customized graphical user interface to the user, the customized graphical user interface based on the type of the wireless device.

12. The system of claim 11, wherein the wireless devices comprise at least one of: a laptop computer, a mobile telephone, and a personal digital assistant.

13. The method of claim 1, further comprising:
using the wireless device as a mobile user interface for a plurality of process control instruments in the industrial process system, the mobile user interface configured to provide different graphical user interfaces to the user, the different graphical user interfaces associated with different process control instruments.

14. A non-transitory computer readable medium embodying a computer program, the computer program comprising computer readable program code for:
detecting a process control instrument at a wireless device when the wireless device is moved into a communication range of the process control instrument in an industrial process system based on radio frequency signals received at the wireless device directly from the process control instrument;
presenting to a user, at the wireless device, a first graphical user interface associated with the process control instrument in response to detecting the process control instrument at the wireless device;
receiving from the user, via the first graphical user interface, one or more configuration settings associated with the process control instrument;
transmitting information identifying the one or more configuration settings to the process control instrument in order to reconfigure the process control instrument; and
presenting to the user, at the wireless device, a second graphical user interface when the wireless device is used to perform a function unrelated to interacting with the process control instrument;
wherein the computer readable program code for presenting the first graphical user interface comprises computer readable program code for presenting the first graphical user interface in response to detecting the radio frequency signals received directly from the process control instrument.

15. The computer readable medium of claim 14, wherein the computer readable program code for presenting the second graphical user interface includes computer readable program code for presenting user interfaces for making or receiving voice calls, accessing messages, and accessing device settings.

16. A method comprising:
detecting a process control instrument at a wireless device when the wireless device is moved into a communication range of the process control instrument in an industrial process system;
presenting to a user, at the wireless device, a first graphical user interface associated with the process control instrument in response to detecting the process control instrument at the wireless device;
receiving from the user, via the first graphical user interface, one or more configuration settings associated with the process control instrument;
transmitting information identifying the one or more configuration settings to the process control instrument in order to reconfigure the process control instrument; and
presenting to the user, at the wireless device, a second graphical user interface when the wireless device is used to perform a function unrelated to interacting with the process control instrument;
wherein the second graphical user interface includes user interfaces for making or receiving voice calls, accessing messages, and accessing device settings.

17. The method of claim 16, wherein detecting the process control instrument at the wireless device comprises detecting the process control instrument based on at least one of: a beacon and a query response from the process control instrument.

18. The method of claim 16, further comprising:
receiving, at the wireless device, data associated with the process control instrument from the process control instrument; and
displaying the data to the user via the first graphical user interface.

19. The method of claim 16, wherein the wireless device comprises one of: a laptop computer, a mobile telephone, and a personal digital assistant.

20. The non-transitory computer readable medium of claim 14, wherein the computer readable program code for detecting the process control instrument at the wireless device comprises computer readable program code for detecting the process control instrument based on at least one of: a beacon and a query response from the process control instrument.

* * * * *